Figure 1:
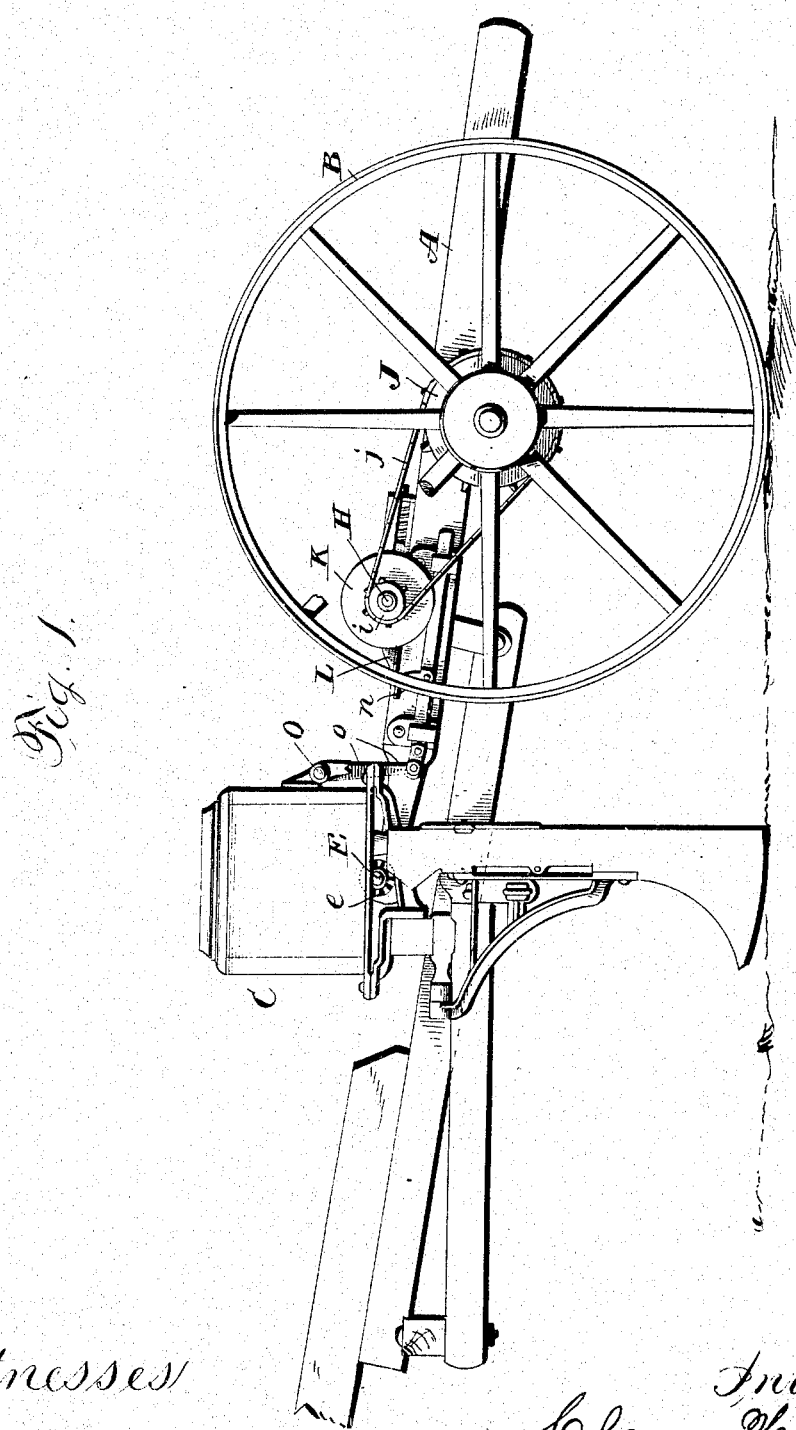

(No Model.) 2 Sheets—Sheet 1.

C. H. & H. L. DOOLEY.
COMBINED CHECK ROW AND DRILL.

No. 509,797. Patented Nov. 28, 1893.

Witnesses
G. J. Williamson,
E. S. Trull.

Inventors
Clarence H. Dooley,
and Harry L. Dooley,
by Franklin H. Hough
Atty.

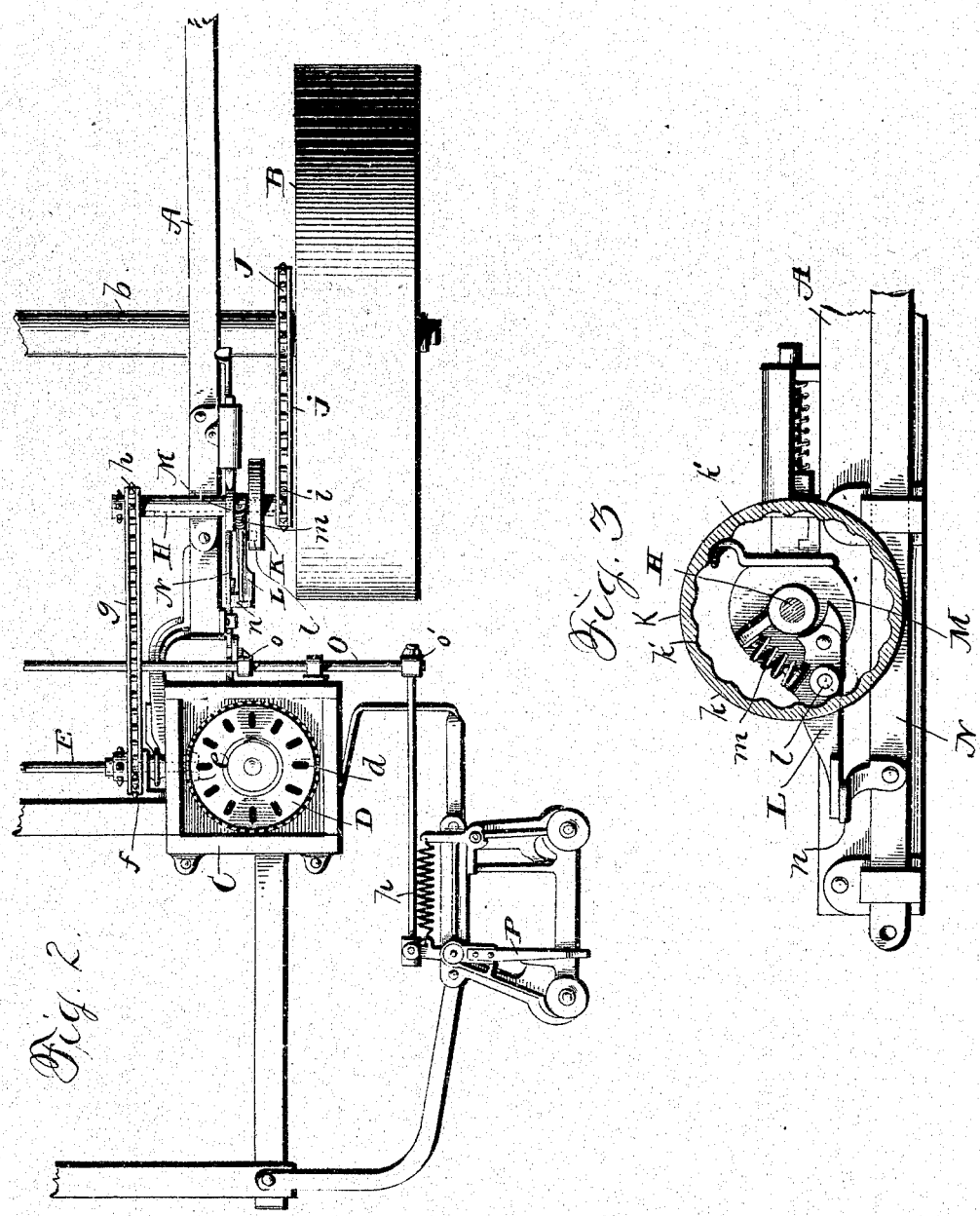

UNITED STATES PATENT OFFICE.

CLARENCE H. DOOLEY AND HARRY L. DOOLEY, OF BLOOMINGTON, ILLINOIS.

COMBINED CHECK-ROW AND DRILL.

SPECIFICATION forming part of Letters Patent No. 509,797, dated November 28, 1893.

Application filed August 9, 1893. Serial No. 482,720. (No model.)

*To all whom it may concern:*

Be it known that we, CLARENCE H. DOOLEY and HARRY L. DOOLEY, citizens of the United States, residing at Bloomington, in the county of McLean and State of Illinois, have invented certain new and useful Improvements in a Combined Check-Row and Drill; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of our invention is to obviate certain objectionable defects in check row corn planters of the class employing a rotating or oscillating seed plate. In one construction, the rotation of the plate is effected wholly through the tappet wire, and this is disadvantageous because the constant jerking of the wire loosens and pulls up the securing stakes, the wire is quickly worn and frequently breaks, and further it is not possible to check as straight as is desirable because of the work imposed on the wire. Another objection is inaccuracy in the number of seed discharged at a time, due to the fact that a cell made large enough to hold several, say three, kernels of corn, will frequently get out more or less than this number.

In another construction of machine the seed plate is rotated continuously by suitable gearing, connecting it with the covering wheels, the seed being discharged from the box one at a time by the seed plate until a given number has accumulated in the receptacle having a valve that is actuated by the tappet wire. This of course, relieves the latter of work as its sole duty is to operate the valve, but, this form of planter is seriously objectionable as obviously it cannot be depended on for accurate work, because owing to irregularities in the ground, the covering wheels will not always make the same number of revolutions between the tappets, so that at one time more grains will be discharged to the tappet actuated valve, and at another time less.

In our invention we drive the rotating seed plate by means of the covering or carrying wheel or wheels, and thus free the wire of this duty, and we use the wire, (or rather the tappet thereon) to control the rotation of said plate so that the latter shall operate for an invariable, predetermined, interval between two tappets, and thus insure the discharge from the seed box of the same number of grains in every instance.

To the ends indicated, our invention consists in the mechanism constructed substantially as hereinafter specified, and illustrated in the annexed drawings, in which—

Figure 1 is a side view of a portion of a corn planter to which our invention is applied; Fig. 2 a plan view thereof. Fig. 3, is a sectional detail view of the clutch preferably employed.

Referring to the drawings by letter and figures A designates a portion of the planter frame, B, one of the covering and carrying wheels, mounted on an axle $b$, and C, one of the seed boxes or hopper, all of which may be of any preferred construction. Within the seed box C, is the rotating seed plate D having a number of cells or openings $d$ each large enough to pass but one grain of corn at a time to suitable delivering mechanism below. Said plate D is provided on the underside with peripheral, bevel gear teeth which mesh with a pinion $e$ on a shaft E that extends across the machine to the other seed box, which, however, is not shown, as the two are alike in construction. Just outside the box, the shaft E carries a sprocket wheel $f$ that is connected by a chain $g$ with a sprocket wheel $h$ mounted on a short shaft H about midway between the seed box C and the axle $b$. Loosely mounted on the outer end of the shaft H is a sprocket wheel $i$ connected by a chain $j$ with a wheel J on said axle. It will thus be seen that provision is made to revolve the seed plate from the axle $b$, it being only required to clutch the loose wheel $i$ to the shaft H. Such clutching is effected by the following means: Attached to the wheel $i$ and also loose on the shaft H is a disk or wheel K having a rim $k$ provided with internal notches $k'$ that are adapted each to be engaged by a roller $l$ on a dog or arm L eccentrically pivoted to and carried by a plate M fixed to and rotating with the shaft H. A coiled spring $m$ placed between a lug on the plate M and a bearing on said arm operates to normally swing the latter to place the roller $l$ into engagement with one of the notches $k'$ and thus clutch the wheel K to the shaft H. The arm L is prevented from swinging its roller into engagement with the disk K until it is desired so to do by prolonging it so that its free end can be engaged by a stop lug $n$ on a sliding bar N, which is connected to the radial arm $o$ of a rock shaft O that in turn is connected by means of a radial arm $o'$ and link or bar $o^2$ to the tappet-actuated lever P, of any usual construction. Movement of the lever P will through the connections just enumerated, slide the bar N so as to free the arm L from the stop lug $n$ and thus permit the wheel K and sprocket $i$ to be clutched to the shaft H. Before the arm L can complete its revolution, the tappet will release the lever P and through the action of a spring $p$, the slide will resume its former position with the stop lug $n$ in the path of and ready to engage the end of arm L, to swing it to lift its roller $l$ out of engagement with the notched rim of the clutch disk K. From the seed plate D the grains pass to a valved receptacle whose valves are actuated from the rock shaft O, whence they pass to the ground by any suitable chute or guide.

The motions of our mechanism are so timed that the rotation of the seed plate is commenced immediately on the lever being moved by a tappet and finished some time before the next tappet is reached, so that the corn is in the valved receptacle ready for delivery when the said next tappet strikes the lever. It will be seen that the degree of movement of the said plate depends entirely on the clutch arm L and as this has an invariable amount of motion, (as shown, a single revolution) it is insured that the same number of grains will always be discharged by said plate. The timing is such that the predetermined movement of the arm L will always occur in the interval of travel from one tappet to another. Of course, the timing of the gearing determines the degree of movement of the seed plate at each operation and accordingly the number of seed discharged to the valved receptacle.

We wish it understood that we do not limit ourselves to the details of construction shown, but regard ourselves as entitled to such variations therefrom as fall within the scope of our invention.

What we claim as new in our invention, and desire to secure by Letters Patent, is—

1. In a check row planter, the combination with the seed dropping mechanism, the tappet devices, of actuating mechanism, and a clutch contrivance, the latter consisting of a disk K having an internally notched rim and loosely mounted upon its supporting shaft, an arm L eccentrically pivoted to a plate M fixed on the same shaft which supports the disk K and having a lateral projection $l$ to be thrown in engagement with the said notched rim, and a bar carrying a stop actuated by the tappet devices to project the said stop within the path of the arm L, substantially as shown and described.

2. In a check row planter, the combination with the seed dropping mechanism and the tappet devices, of actuating mechanism and a clutch contrivance consisting of a disk K secured to a transmitting wheel $i$, both loosely mounted on a shaft, and having an internally notched rim, a plate M fixed on the shaft carrying the disk K, an arm L pivoted to the plate M and having a roller $l$, a spring $m$ between corresponding stops on the plate M and the arm L, and a movable bar carrying a stop actuated by the tappet devices to project the said stop within the path of the said arm L, substantially as shown and described.

3. In a check row corn planter, the combination of the seed dropping mechanism, a shaft H forming part of a train of gearing for transmitting motion to the seed dropping mechanism, a pinion $i$ loosely mounted on the shaft H, and positively rotated from the power driving wheel, a disk K revolving with the pinion $i$ and having an internally notched rim, a plate M secured on the shaft H, an arm L eccentrically pivoted to the plate M and carrying a roller $l$, a spring $m$ between corresponding stops on the plate M and the arm L, a movable bar N having a stop $n$, a rock shaft adapted to operate the bar N, and a tappet mechanism arranged to actuate the said rock shaft, substantially as set forth.

In testimony whereof we affix our signatures in presence of two witnesses.

CLARENCE H. DOOLEY.
HARRY L. DOOLEY.

Witnesses:
GEO. A. STINYFIELD,
W. H. HUGHES.